(12) United States Patent
Smith

(10) Patent No.: US 12,370,862 B1
(45) Date of Patent: Jul. 29, 2025

(54) RADIUS ROD ASSEMBLY

(71) Applicant: Shock Therapy Suspension, Inc., Duluth, GA (US)

(72) Inventor: Justin Smith, Wittmann, AZ (US)

(73) Assignee: Shock Therapy Suspension, Inc., Duluth, GA (US)

( * ) Notice: Subject to any disclaimer, the term of this patent is extended or adjusted under 35 U.S.C. 154(b) by 0 days.

(21) Appl. No.: 18/787,027

(22) Filed: Jul. 29, 2024

(51) Int. Cl.
*B60G 21/055* (2006.01)

(52) U.S. Cl.
CPC .................... *B60G 21/0551* (2013.01)

(58) Field of Classification Search
CPC ...... B60G 21/0551; B60G 7/00; B62D 19/00; B62D 21/183; B62D 23/005
See application file for complete search history.

(56) References Cited

U.S. PATENT DOCUMENTS

2023/0158848 A1* 5/2023 Scheuerell ............ B60G 3/202
280/788

* cited by examiner

*Primary Examiner* — Jason D Shanske
*Assistant Examiner* — Scott Lawrence Strickler
(74) *Attorney, Agent, or Firm* — Schmeiser, Olsen & Watts LLP

(57) ABSTRACT

A radius rod assembly is provided. The radius rod assembly has an upper radius rod with a laterally offset portion which accommodates an upwardly offset portion of a lower radius rod. The upwardly offset portion provides additional ground clearance for off road vehicles. An offset toggle plate interconnects end portions of the upper and lower radius rods. The radius rod assembly extends between a central bracket of a vehicle frame to an axle hub assembly and a rear shock assembly.

20 Claims, 10 Drawing Sheets

RADIUS ROD ASSEMBLY

BACKGROUND OF THE INVENTION

Technical Field

This invention relates generally to a radius rod assembly and more particularly to a radius rod assembly for an off road vehicle.

State of the Art

The use of off road vehicles (ORVs), such as all-terrain vehicles (ATVs) and utility terrain vehicles (UTVs), are common. Off-roading performance and the ability to drive through any terrain are important to riders.

Upper and lower radius rods, parts of the suspension, on ORVs are sometimes problematic. In order to get more ground clearance for example, for rocks, a raised center section of the lower radius rod, rather than a straight center section of the lower radius rod, is needed to provide additional ground clearance. However, sometimes stock radius rods that are available are too close to various components of the suspension system, such as a sway bar mount, of the ORV so the radius rods cannot be raised to get clearance. Moving suspension components to allow for more room is prohibitively expensive.

Accordingly, there is a need for a high clearance radius rod assembly that can provide additional ground clearance and is a cost effective solution to moving stock radius rods.

SUMMARY OF THE INVENTION

The present invention relates to a high clearance radius rod assembly having an upper radius rod and a lower radius rod. The upper radius rod is offset rearward which clears the sway bar and the lower radius rod of an ORV allowing for high ground clearance.

An embodiment includes a radius rod assembly, the radius rod assembly comprising: a pair of radius rods having an upper radius rod member and a lower radius rod member, wherein the upper radius rod member is provided with a first upper end portion and a second upper end portion, and the lower radius rod member is provided with a first lower end portion and a second lower end portion; a raised upwardly extending offset central portion provided along the lower radius rod member between the first lower end portion and the second lower end portion; and a laterally offset central portion provided along the upper radius rod member between the first upper end portion and the second upper end portion, wherein the laterally offset central portion is configured to accommodate the raised upwardly extending offset central portion of the lower radius rod member therein.

The lower radius rod member may comprise a first longitudinally extending portion, an upwardly extending angled portion, a longitudinally extending central portion, a downwardly extending angled portion and a second longitudinally extending portion, wherein the raised upwardly extending offset central portion is defined by the upwardly extending angled portion, the longitudinally extending central portion and the downwardly extending angled portion therein. A first lower angled reinforcing plate portion may extend between the first longitudinally extending portion and the upwardly extending angled portion, wherein a second lower angled reinforcing plate portion extends between the second longitudinally extending portion and the downwardly extending angled portion.

A lower longitudinally extending reinforcing plate portion may be provided with an upwardly extending angled section extending between the upwardly extending angled portion and the longitudinally extending central portion, a longitudinally extending central section extending from the upwardly extending angled section along the longitudinally extending central portion, and a downwardly extending angled section extending from the longitudinally extending central section between the longitudinally extending central portion and the downwardly extending angled portion. The upper radius rod member may be provided with an axially extending portion, an outwardly extending angled portion and an inwardly extending angled portion, wherein the laterally offset central portion is defined by the outwardly extending angled portion and the inwardly extending angled portion.

A first upper angled reinforcing plate portion may extend between the axially extending portion and the outwardly extending angled portion, wherein a second upper angled reinforcing plate portion extends between the outwardly extending angled portion and the inwardly extending angled portion. An offset toggle plate member may be provided between the first upper end portion of the upper radius rod member and the first lower end portion of the lower radius rod member, wherein the offset toggle plate member is provided with a first plate portion having a first plate aperture therein, a second plate portion having a second plate aperture therein and an angled central plate portion extending therebetween.

Another embodiment includes an off road vehicle having a radius rod assembly, the radius rod assembly comprising: a pair of radius rods having an upper radius rod member and a lower radius rod member, wherein the upper radius rod member is provided with a first upper end portion and a second upper end portion, and the lower radius rod member is provided with a first lower end portion and a second lower end portion; a raised upwardly extending offset central portion provided along the lower radius rod member between the first lower end portion and the second lower end portion; and a laterally offset central portion provided along the upper radius rod member between the first upper end portion and the second upper end portion, wherein the laterally offset central portion is configured to accommodate the raised upwardly extending offset central portion of the lower radius rod member therein.

The lower radius rod member may comprise a first longitudinally extending portion, an upwardly extending angled portion, a longitudinally extending central portion, a downwardly extending angled portion and a second longitudinally extending portion, wherein the raised upwardly extending offset central portion is defined by the upwardly extending angled portion, the longitudinally extending central portion and the downwardly extending angled portion therein. A first lower angled reinforcing plate portion may extend between the first longitudinally extending portion and the upwardly extending angled portion, wherein a second lower angled reinforcing plate portion extends between the second longitudinally extending portion and the downwardly extending angled portion.

A lower longitudinally extending reinforcing plate portion may be provided with an upwardly extending angled section extending between the upwardly extending angled portion and the longitudinally extending central portion, a longitudinally extending central section extending from the upwardly extending angled section along the longitudinally extending central portion, and a downwardly extending angled section extending from the longitudinally extending central section between the longitudinally extending central portion and the downwardly extending angled portion.

The upper radius rod member may be provided with an axially extending portion, an outwardly extending angled portion and an inwardly extending angled portion, wherein the laterally offset central portion is defined by the outwardly extending angled portion and the inwardly extending angled portion. A first upper angled reinforcing plate portion may extend between the axially extending portion and the outwardly extending angled portion, wherein a second upper angled reinforcing plate portion extends between the outwardly extending angled portion and the inwardly extending angled portion. An offset toggle plate member may be provided between the first upper end portion of the upper radius rod member and the first lower end portion of the lower radius rod member, wherein the offset toggle plate member is provided with a first plate portion having a first plate aperture therein, a second plate portion having a second plate aperture therein and an angled central plate portion extending therebetween.

Another embodiment includes a method of assembling a radius rod assembly, the method comprising: providing a pair of radius rods having an upper radius rod member and a lower radius rod member, providing the upper radius rod member with a first upper end portion and a second upper end portion; providing the lower radius rod member with a first lower end portion and a second lower end portion; providing a raised upwardly extending offset central portion along the lower radius rod member between the first lower end portion and the second lower end portion; laterally offsetting a central portion of the upper radius rod member between the first upper end portion and the second upper end portion; and configuring the laterally offset central portion to accommodate the raised upwardly extending offset central portion of the lower radius rod member therein.

The method may further comprise providing the lower radius rod member with a first longitudinally extending portion, an upwardly extending angled portion, a longitudinally extending central portion, a downwardly extending angled portion and a second longitudinally extending portion, wherein the raised upwardly extending offset central portion is defined by the upwardly extending angled portion, the longitudinally extending central portion and the downwardly extending angled portion therein. The method may further comprise extending a first lower angled reinforcing plate portion between the first longitudinally extending portion and the upwardly extending angled portion and extending a second lower angled reinforcing plate portion between the second longitudinally extending portion and the downwardly extending angled portion.

The method may further comprise providing a lower longitudinally extending reinforcing plate portion with an upwardly extending angled section between the upwardly extending angled portion and the longitudinally extending central portion, extending a longitudinally extending central section from the upwardly extending angled section along the longitudinally extending central portion, and extending a downwardly extending angled section from the longitudinally extending central section between the longitudinally extending central portion and the downwardly extending angled portion.

The method may further comprise providing the upper radius rod member with an axially extending portion, an outwardly extending angled portion and an inwardly extending angled portion, wherein the laterally offset central portion is defined by the outwardly extending angled portion and the inwardly extending angled portion. The method may further comprise extending a first upper angled reinforcing plate portion between the axially extending portion and the outwardly extending angled portion and extending a second upper angled reinforcing plate portion between the outwardly extending angled portion and the inwardly extending angled portion.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

As discussed above, embodiments of the present invention relate to a high clearance radius rod assembly for an ORV vehicle frame. The radius rod assembly is part of the vehicle suspension system having an upper radius rod and lower radius rod.

In the present invention, the upper radius rod is offset to the rear of the vehicle frame in order to accommodate an offset central portion of the lower radius rod. The lower radius rod clears the upper radius rod by tucking up in front and/or alongside of the upper radius rod.

Figure 1A:
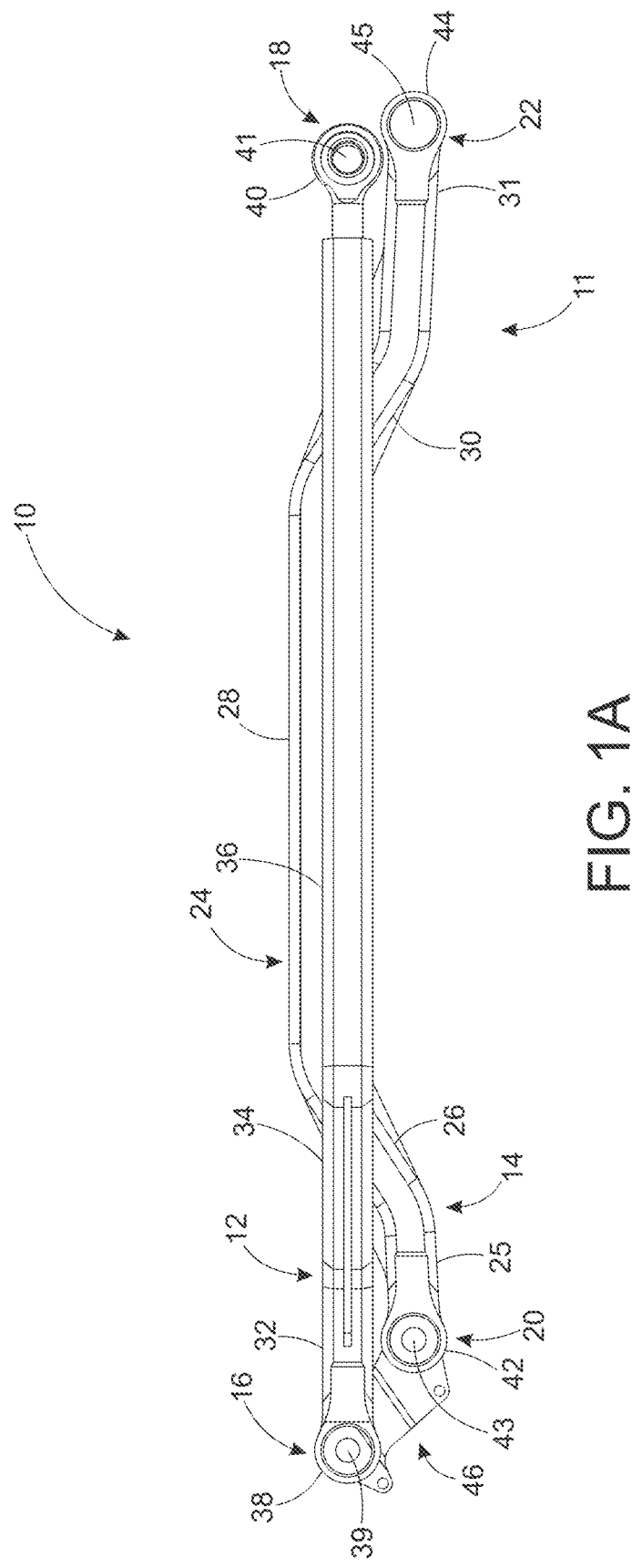
FIG. 1A is a frontal view of a radius rod assembly in accordance with an embodiment.
Figure 2A:
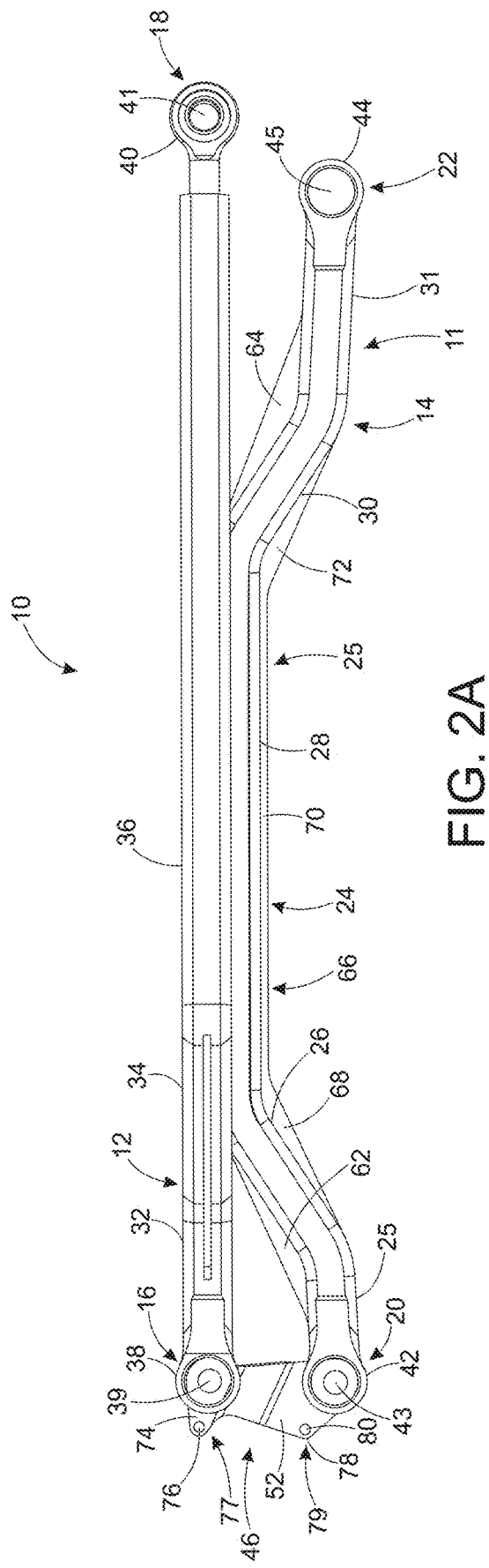
FIG. 2A is a frontal view of a radius rod assembly in accordance with an embodiment.
Figure 2B:
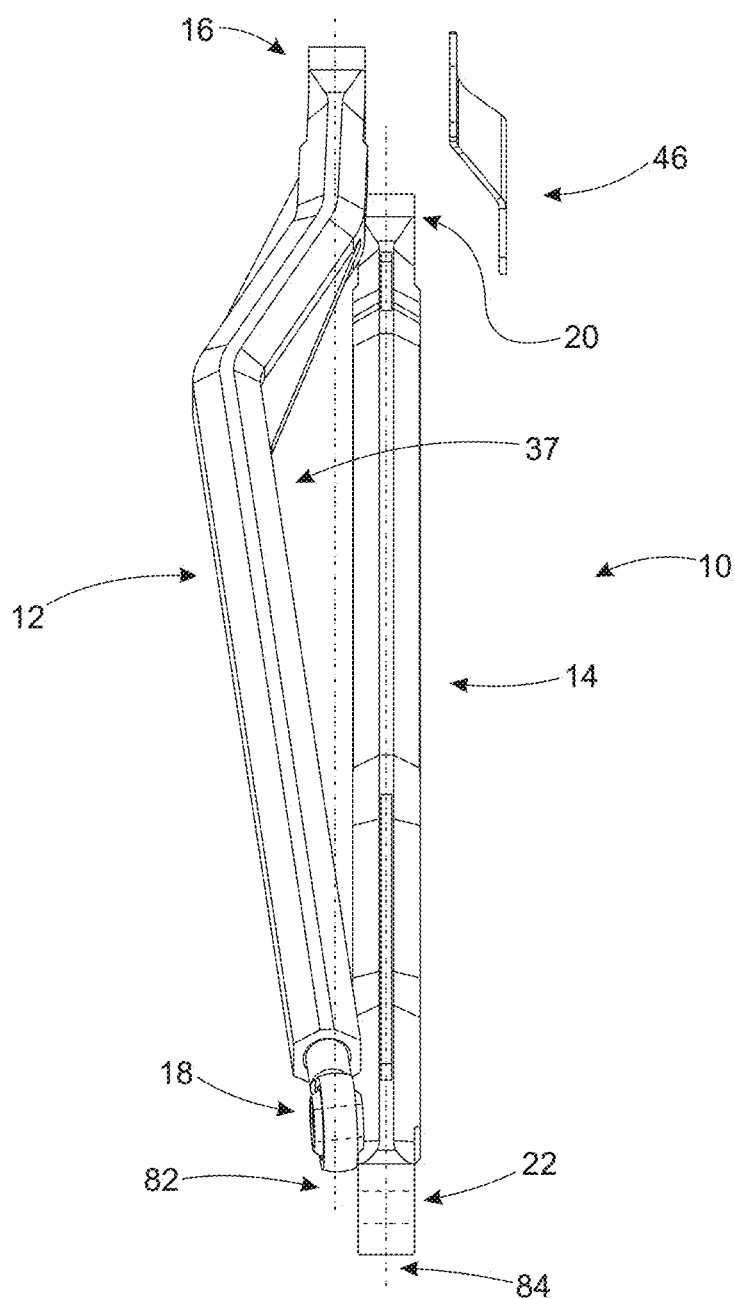
FIG. 2B is a top view of a radius rod assembly in accordance with an embodiment.
Figure 3A:
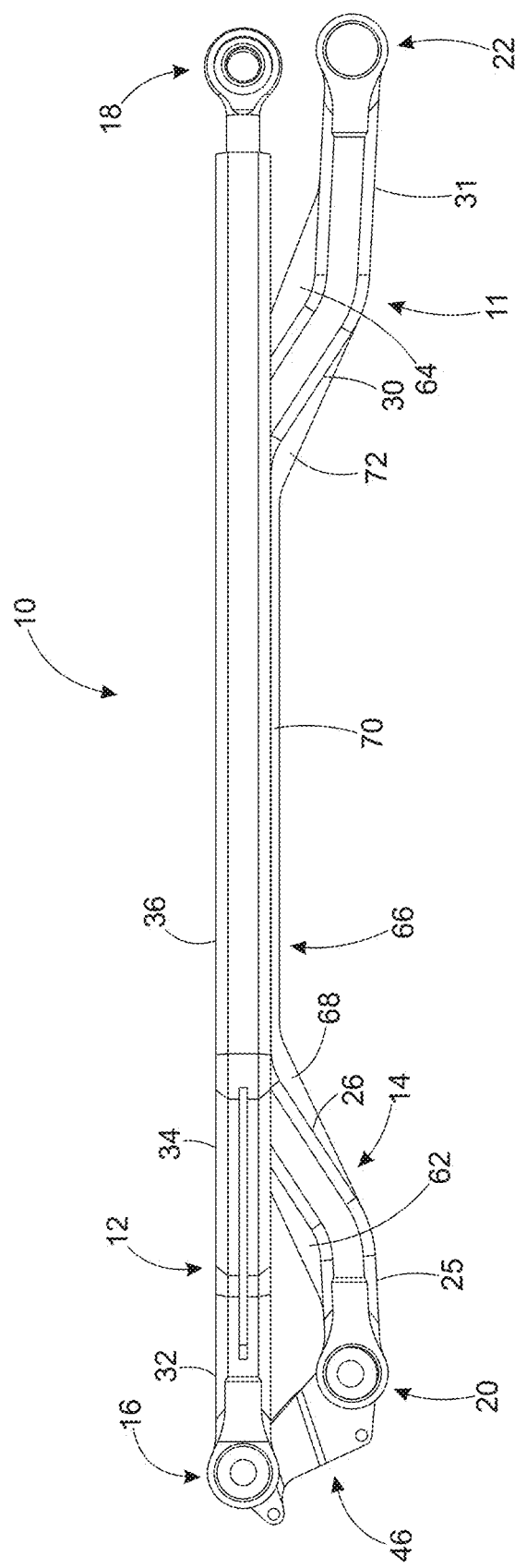
FIG. 3A is a frontal view of a radius rod assembly in accordance with an embodiment.
Figure 3B:
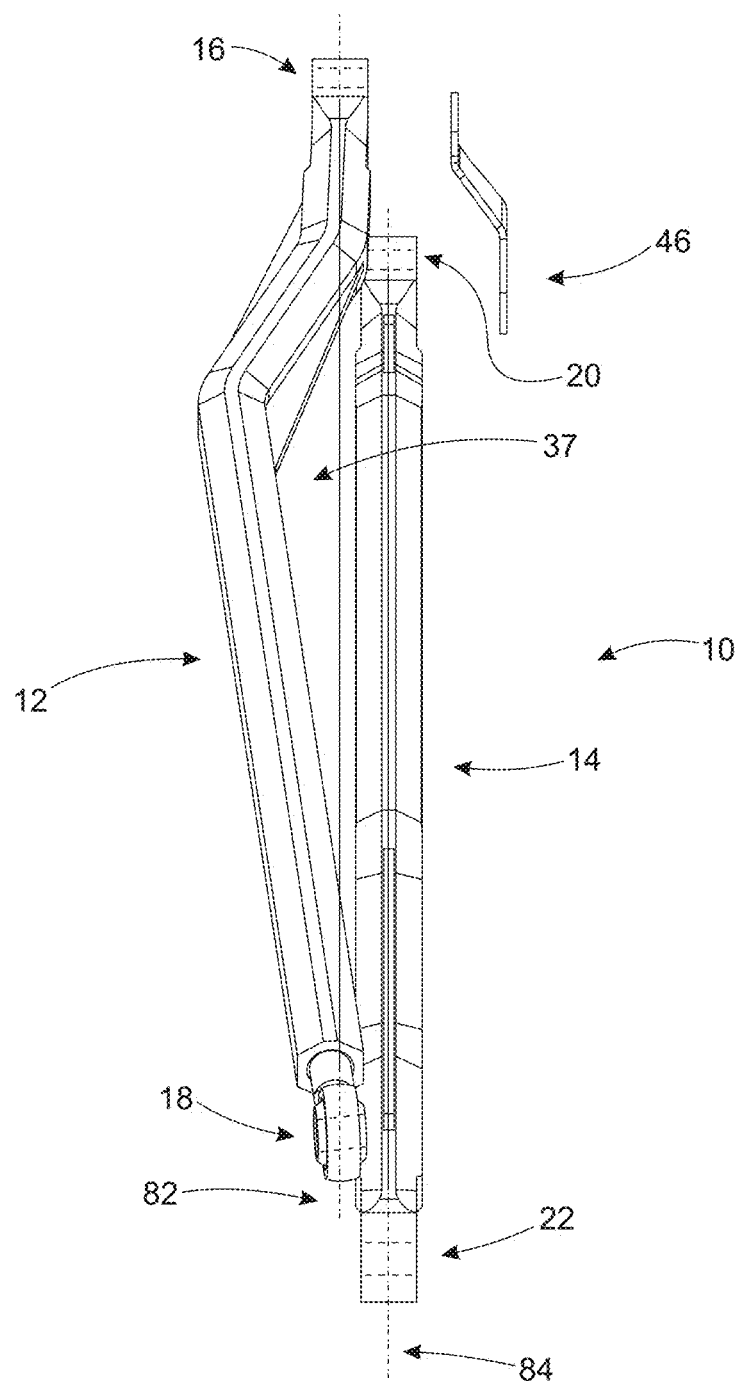
FIG. 3B is a top view of a radius rod assembly in accordance with an embodiment.

Referring to FIGS. 1-3, a radius rod assembly 10 is provided with a pair of radius rods 11. The pair of radius rods 11 comprises an upper radius rod member 12 and a lower radius rod member 14. The upper radius rod member 12 is provided with a first upper end portion 16 and a second upper end portion 18. The lower radius rod member 14 is provided with a first lower end portion 20 and a second lower end portion 22. A raised upwardly extending offset central portion 24 is provided along the lower radius rod member 14. The lower radius rod member 14 comprises a first longitudinally extending portion 25, an upwardly extending angled portion 26, a longitudinally extending central portion 28, a downwardly extending angled portion 30 and a second longitudinally extending portion 31. The raised upwardly extending offset central portion 24 is defined by the upwardly extending angled portion 26, the longitudinally extending central portion 28 and the downwardly extending angled portion 30 therein.

Figure 1B:
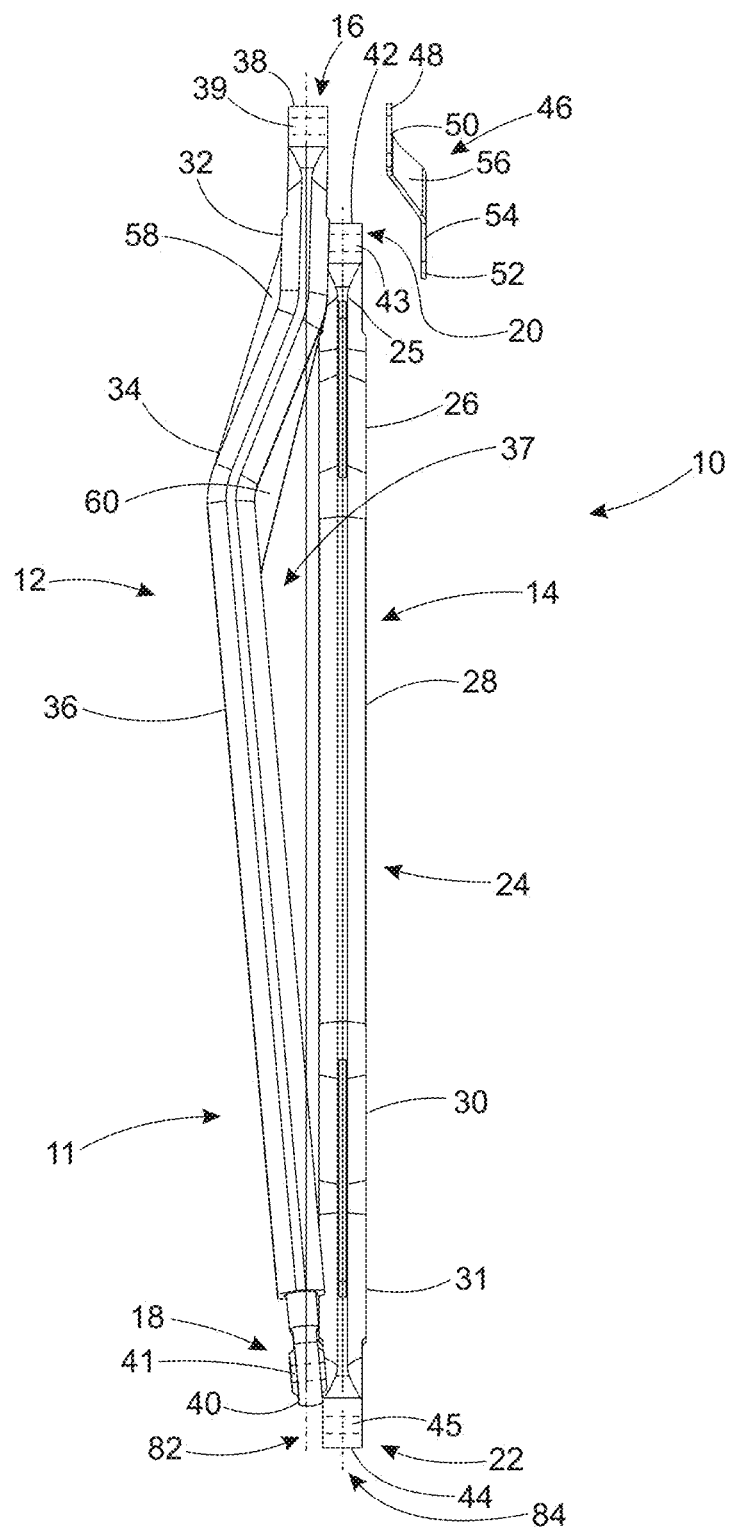
FIG. 1B is a top view of a radius rod assembly in accordance with an embodiment.

Referring to FIG. 1B, the upper radius rod member 12 is provided with an axially extending portion 32, an outwardly extending angled portion 34 and an inwardly extending angled portion 36. The outwardly extending angled portion 34 and the inwardly extending angled portion 36 together define a laterally offset central portion 37 of the upper radius rod member 12 which accommodates the raised upwardly extending offset central portion 24 (See FIGS. 1A and 2A).

Referring to FIG. 1A, the upper radius rod member 12 is provided with a first upper fitting member 38 having a first upper fitting end aperture 39 at the first upper end portion 16 thereof. The upper radius rod member 12 is also provided with a second upper fitting member 40 having a second upper fitting end aperture 41 at the second upper end portion 18 thereof. The lower radius rod member 14 is provided with a first lower fitting member 42 having first lower fitting end aperture 43 at the first lower end portion 20 thereof. The lower radius rod member 14 is also provided with a second lower fitting member 44 having a second lower fitting end aperture 45 at the second lower end portion 22 thereof.

Referring to FIGS. 1A, 2A and 1B, an offset toggle plate member 46 is provided between the first upper end portion 16 of the upper radius rod member 12 and the first lower end portion 20 of the lower radius rod member 14. The offset toggle plate member 46 is provided with a first plate portion 48 having a first plate aperture 50 therein, a second plate portion 52 having a second plate aperture 54 therein and an angled central plate portion 56 extending therebetween. The offset toggle plate member 46 is further provided with a radially extending triangular plate portion 74 having an outwardly positioned aperture 76 in an upper toggle plate portion 77 of the offset toggle plate member 46. The offset toggle plate member 46 is also provided with a radially extending corner portion 78 on the second plate portion 52 of a lower toggle plate portion 79 of the offset toggle plate member 46. The radially extending corner portion 78 is provided with an aligned corner aperture 80 therein.

Referring to FIG. 1B, a first upper angled reinforcing plate portion 58 extends between the axially extending portion 32 and the outwardly extending angled portion 34 of the first upper radius rod member 12. A second upper angled reinforcing plate portion 60 extends between the outwardly extending angled portion 34 and the inwardly extending angled portion 36 of upper radius rod member 12.

Referring to FIG. 2A, a first lower angled reinforcing plate portion 62 extends between the first longitudinally extending portion 25 and the upwardly extending angled portion 26 of the lower radius rod member 14. A second lower angled reinforcing plate portion 64 extends between the second longitudinally extending portion 31 and the downwardly extending angled portion 30 of the lower radius rod member 14. A lower longitudinally extending reinforcing plate portion 66 is provided with an upwardly extending angled section 68 extending between the upwardly extending angled portion 26 and the longitudinally extending central portion 28 of the lower radius rod member 14. A longitudinally extending central section 70 extends from the upwardly extending angled section 68 along the longitudinally extending central portion 28 of the lower radius rod member 14. A downwardly extending angled section 72 extends from the longitudinally extending central section 70 between the longitudinally extending central portion 28 and the downwardly extending angled portion 30 of the lower radius rod member 14.

Referring to FIGS. 1B and 2B, a longitudinally extending dashed line 82 extends between the first upper end portion 16 and the second upper end portion 18 of the upper radius rod member 12. The laterally offset central portion 37 of the upper radius rod member 12 is defined within the longitudinally extending dashed line 82 and the upper radius rod member 12. A longitudinally extending axis line 84 extends along the lower radius rod member 14.

Figure 4:
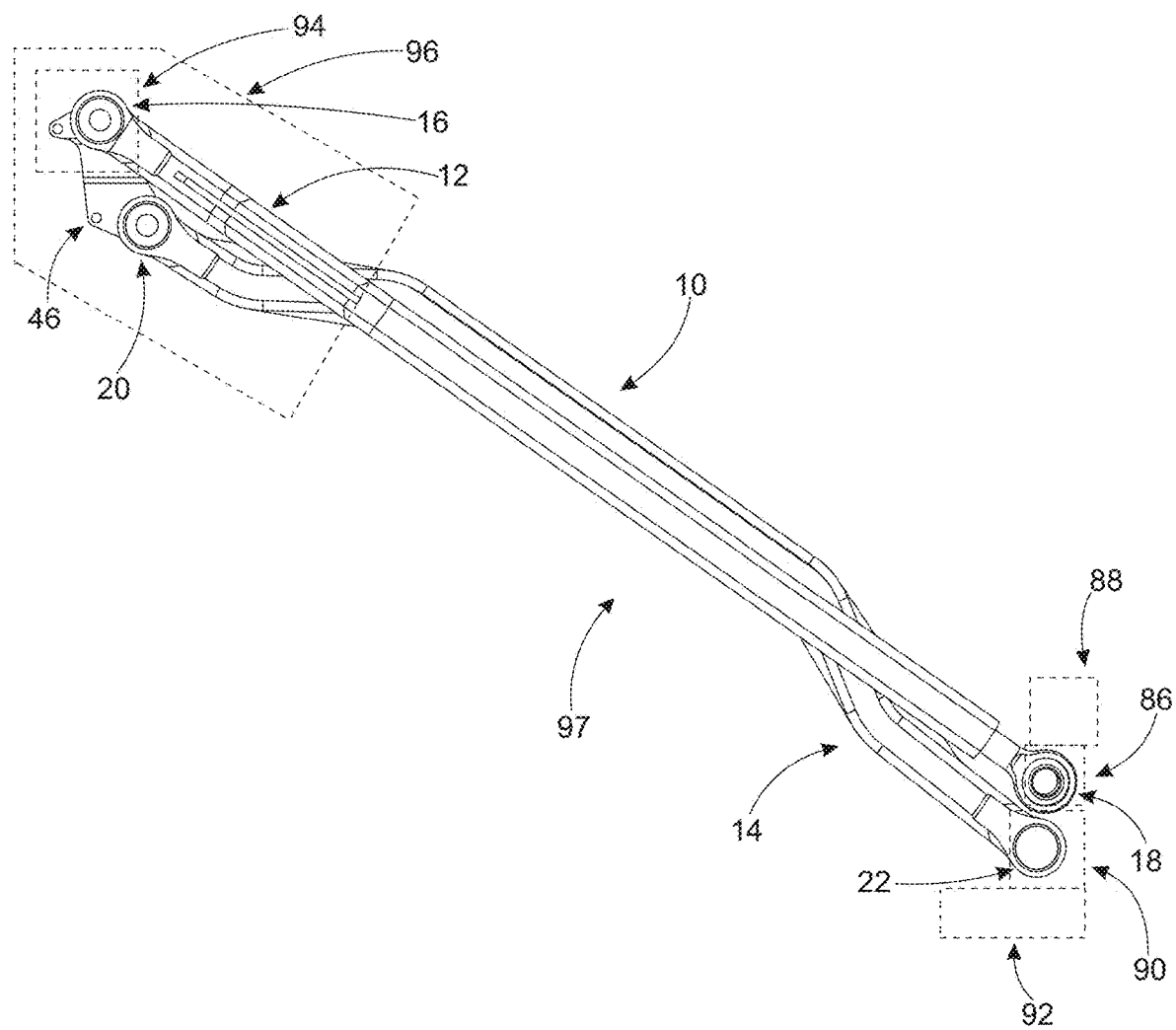
FIG. 4 is a frontal view of a radius rod assembly in accordance with an embodiment.
Figure 5:
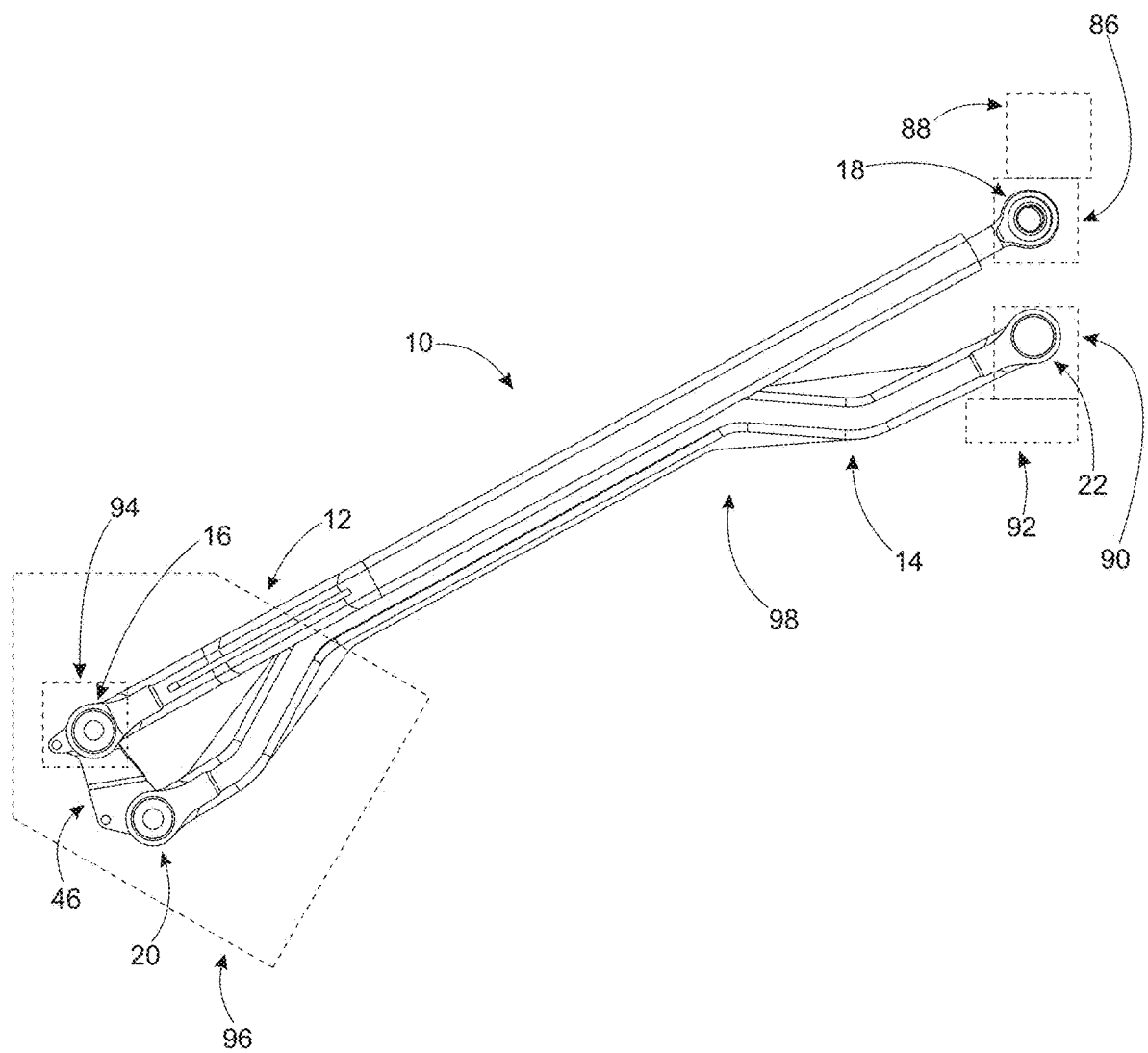
FIG. 5 is a frontal view of a radius rod assembly in accordance with an embodiment.
Figure 6:
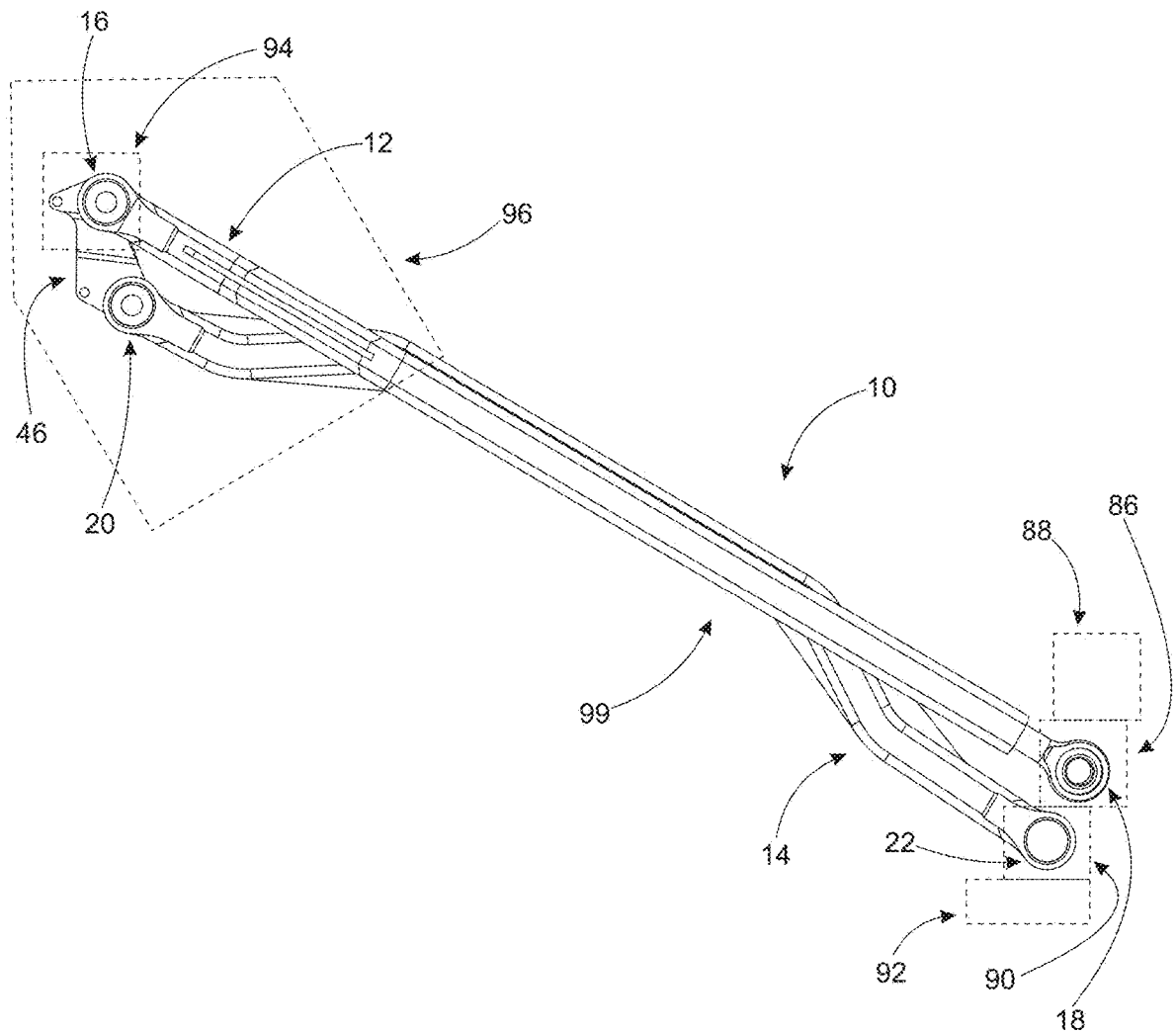
FIG. 6 is a frontal view of a radius rod assembly in accordance with an embodiment.

Referring to FIGS. 4-6, various positions of the radius rod assembly 10 on an offroad vehicle are shown. A droop, or first position, of the radius rod assembly 10 is shown in FIG. 4. The first position occurs when the radius rod assembly 10 is in a fully extended downward position 97 relative to a vehicle frame 96. The upper radius rod member 12 of the radius rod assembly 10 is secured between a central mounting bracket 94 of the vehicle frame 96 at the first upper end portion 16 of the upper radius rod member 12 and a bracket portion 86 of an axle hub assembly 88 at the second upper end portion 18 of the upper radius rod member 12.

The lower radius rod member 14 of the radius rod assembly 10 is secured between the offset toggle plate member 46 at the first lower end portion 20 of the lower radius rod member 14 and a bracket member 90 of a rear shock assembly 92 at the second lower end portion 22 of the lower radius rod member 14. The offset toggle plate member 46 is secured to the first upper end portion 16 of the upper radius rod member 12 and the central mounting bracket 94 of the vehicle frame 96.

Referring to FIG. 5, a compressed, or second position, of the radius rod assembly 10 is shown. The second position occurs when the radius rod assembly 10 is in an upward position 98 relative to the vehicle frame 96. The upward position 98 occurs when the rear shock assembly 92 has been compressed relative to the vehicle frame 96.

Referring to FIG. 6, an approximate normal ride height, or third position, of the radius rod assembly 10 is shown. The third position occurs when the radius rod assembly 10 is in a partially downward position 99 relative to the vehicle frame 96. The partially downward position 99 occurs when the vehicle frame 96 is in a normal running position.

Figure 7:
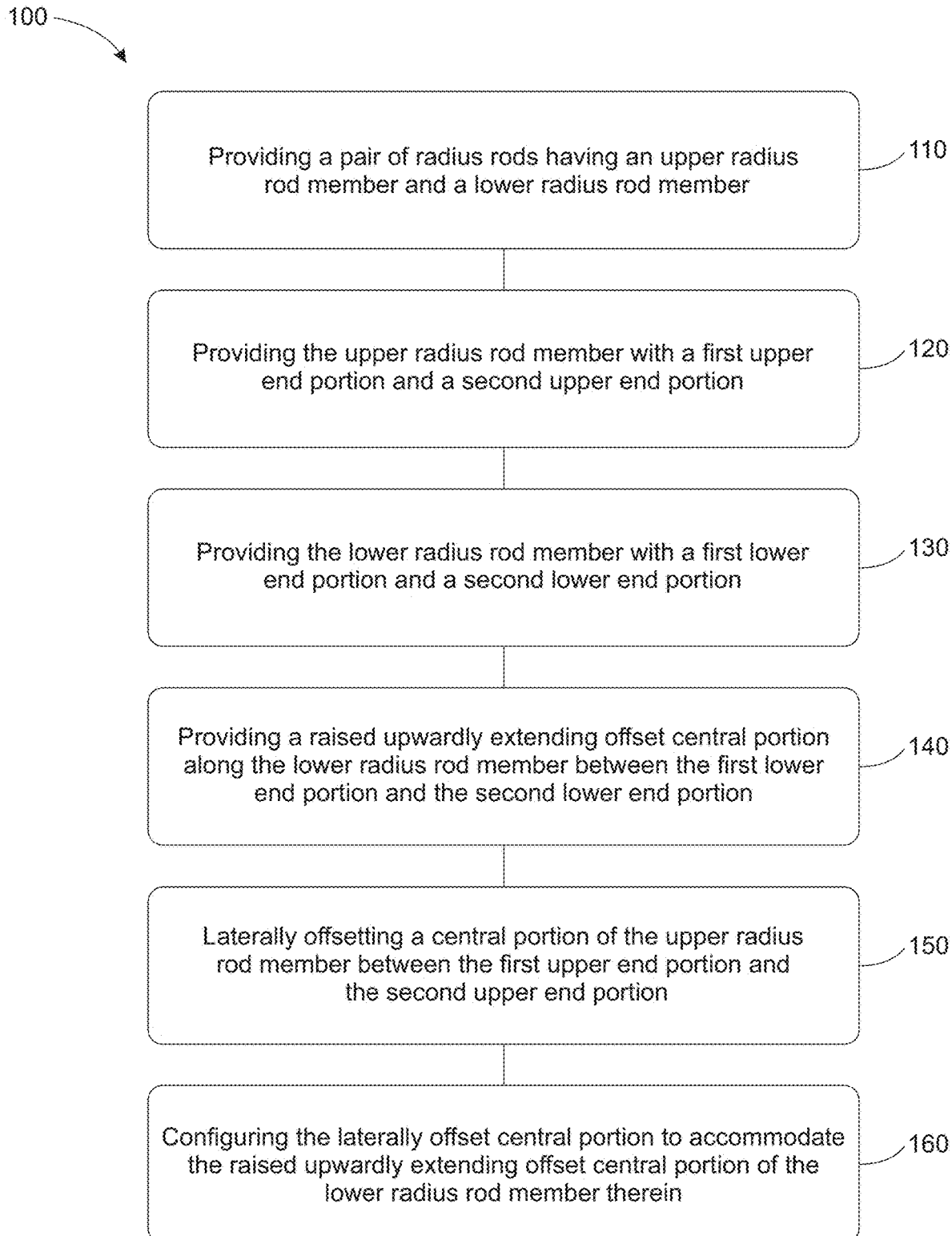
FIG. 7 is a block diagram of steps of a method of assembling of a radius rod assembly in accordance with an embodiment.

FIG. 7 is a block diagram of steps of a method 100 of assembling a radius rod assembly. Method 100 comprises providing a pair of radius rods having an upper radius rod member and a lower radius rod member (Step 110); providing the upper radius rod member with a first upper end portion and a second upper end portion (Step 120); providing the lower radius rod member with a first lower end portion and a second lower end portion (Step 130); providing a raised upwardly extending offset central portion along the lower radius rod member between the first lower end portion and the second lower end portion (Step 140); laterally offsetting a central portion of the upper radius rod member between the first upper end portion and the second upper end portion (Step 150); and configuring the laterally offset central portion to accommodate the raised upwardly extending offset central portion of the lower radius rod member therein (Step 160).

The method further comprises providing the lower radius rod member with a first longitudinally extending portion, an upwardly extending angled portion, a longitudinally extending central portion, a downwardly extending angled portion and a second longitudinally extending portion, wherein the raised upwardly extending offset central portion is defined by the upwardly extending angled portion, the longitudinally extending central portion and the downwardly extending angled portion therein; extending a first lower angled reinforcing plate portion between the first longitudinally extending portion and the upwardly extending angled portion and extending a second lower angled reinforcing plate portion between the second longitudinally extending portion and the downwardly extending angled portion; providing a lower longitudinally extending reinforcing plate portion with an upwardly extending angled section between the upwardly extending angled portion and the longitudinally extending central portion, extending a longitudinally extending central section from the upwardly extending angled section along the longitudinally extending central portion, and extending a downwardly extending angled section from the longitudinally extending central section between the longitudinally extending central portion and the downwardly extending angled portion; providing the upper radius rod member with an axially extending portion, an outwardly extending angled portion and an inwardly extending angled portion, wherein the laterally offset central portion is defined by the outwardly extending angled portion and the inwardly extending angled portion; and extending a first upper angled reinforcing plate portion between the axially extending portion and the outwardly extending angled portion and extending a second upper angled reinforcing plate portion between the outwardly extending angled portion and the inwardly extending angled portion.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A radius rod assembly, the radius rod assembly comprising:
    a pair of radius rods having an upper radius rod member and a lower radius rod member, wherein the upper radius rod member is provided with a first upper end portion and a second upper end portion, and the lower radius rod member is provided with a first lower end portion and a second lower end portion;
    a raised upwardly extending offset central portion provided along the lower radius rod member between the first lower end portion and the second lower end portion; and
    a laterally offset central portion provided along the upper radius rod member between the first upper end portion and the second upper end portion, wherein the laterally offset central portion is configured to accommodate the raised upwardly extending offset central portion of the lower radius rod member therein.

2. The radius rod assembly of claim 1, wherein the lower radius rod member comprises a first longitudinally extending portion, an upwardly extending angled portion, a longitudinally extending central portion, a downwardly extending angled portion and a second longitudinally extending portion, wherein the raised upwardly extending offset central portion is defined by the upwardly extending angled portion, the longitudinally extending central portion and the downwardly extending angled portion therein.

3. The radius rod assembly of claim 2, wherein a first lower angled reinforcing plate portion extends between the first longitudinally extending portion and the upwardly extending angled portion, wherein a second lower angled reinforcing plate portion extends between the second longitudinally extending portion and the downwardly extending angled portion.

4. The radius rod assembly of claim 2, wherein a lower longitudinally extending reinforcing plate portion is provided with an upwardly extending angled section extending between the upwardly extending angled portion and the longitudinally extending central portion, a longitudinally extending central section extending from the upwardly extending angled section along the longitudinally extending central portion, and a downwardly extending angled section extending from the longitudinally extending central section between the longitudinally extending central portion and the downwardly extending angled portion.

5. The radius rod assembly of claim 1, wherein the upper radius rod member is provided with an axially extending portion, an outwardly extending angled portion and an inwardly extending angled portion, wherein the laterally offset central portion is defined by the outwardly extending angled portion and the inwardly extending angled portion.

6. The radius rod assembly of claim 5, wherein a first upper angled reinforcing plate portion extends between the axially extending portion and the outwardly extending angled portion, wherein a second upper angled reinforcing plate portion extends between the outwardly extending angled portion and the inwardly extending angled portion.

7. The radius rod assembly of claim 1, wherein an offset toggle plate member is provided between the first upper end portion of the upper radius rod member and the first lower end portion of the lower radius rod member, wherein the offset toggle plate member is provided with a first plate portion having a first plate aperture therein, a second plate portion having a second plate aperture therein and an angled central plate portion extending therebetween.

8. An off road vehicle having a radius rod assembly, the radius rod assembly comprising:
    a pair of radius rods having an upper radius rod member and a lower radius rod member, wherein the upper radius rod member is provided with a first upper end portion and a second upper end portion, and the lower radius rod member is provided with a first lower end portion and a second lower end portion;
    a raised upwardly extending offset central portion provided along the lower radius rod member between the first lower end portion and the second lower end portion; and
    a laterally offset central portion provided along the upper radius rod member between the first upper end portion and the second upper end portion, wherein the laterally offset central portion is configured to accommodate the raised upwardly extending offset central portion of the lower radius rod member therein.

9. The off road vehicle of claim 8, wherein the lower radius rod member comprises a first longitudinally extending portion, an upwardly extending angled portion, a longitudinally extending central portion, a downwardly extending angled portion and a second longitudinally extending portion, wherein the raised upwardly extending offset central portion is defined by the upwardly extending angled portion, the longitudinally extending central portion and the downwardly extending angled portion therein.

10. The off road vehicle of claim 9, wherein a first lower angled reinforcing plate portion extends between the first longitudinally extending portion and the upwardly extending angled portion, wherein a second lower angled reinforcing plate portion extends between the second longitudinally extending portion and the downwardly extending angled portion.

11. The off road vehicle of claim 9, wherein a lower longitudinally extending reinforcing plate portion is provided with an upwardly extending angled section extending between the upwardly extending angled portion and the longitudinally extending central portion, a longitudinally extending central section extending from the upwardly extending angled section along the longitudinally extending central portion, and a downwardly extending angled section extending from the longitudinally extending central section between the longitudinally extending central portion and the downwardly extending angled portion.

12. The off road vehicle of claim 8, wherein the upper radius rod member is provided with an axially extending portion, an outwardly extending angled portion and an inwardly extending angled portion, wherein the laterally offset central portion is defined by the outwardly extending angled portion and the inwardly extending angled portion.

13. The off road vehicle of claim 12, wherein a first upper angled reinforcing plate portion extends between the axially extending portion and the outwardly extending angled portion, wherein a second upper angled reinforcing plate portion extends between the outwardly extending angled portion and the inwardly extending angled portion.

14. The off road vehicle of claim 8, wherein an offset toggle plate member is provided between the first upper end portion of the upper radius rod member and the first lower end portion of the lower radius rod member, wherein the offset toggle plate member is provided with a first plate portion having a first plate aperture therein, a second plate portion having a second plate aperture therein and an angled central plate portion extending therebetween.

15. A method of assembling a radius rod assembly, the method comprising:
   providing a pair of radius rods having an upper radius rod member and a lower radius rod member;
   providing the upper radius rod member with a first upper end portion and a second upper end portion;
   providing the lower radius rod member with a first lower end portion and a second lower end portion;
   providing a raised upwardly extending offset central portion along the lower radius rod member between the first lower end portion and the second lower end portion;
   laterally offsetting a central portion of the upper radius rod member between the first upper end portion and the second upper end portion; and
   configuring the laterally offset central portion to accommodate the raised upwardly extending offset central portion of the lower radius rod member therein.

16. The method of assembling of claim 15, the method further comprising providing the lower radius rod member with a first longitudinally extending portion, an upwardly extending angled portion, a longitudinally extending central portion, a downwardly extending angled portion and a second longitudinally extending portion, wherein the raised upwardly extending offset central portion is defined by the upwardly extending angled portion, the longitudinally extending central portion and the downwardly extending angled portion therein.

17. The method of assembling of claim 16, the method further comprising extending a first lower angled reinforcing plate portion between the first longitudinally extending portion and the upwardly extending angled portion and extending a second lower angled reinforcing plate portion between the second longitudinally extending portion and the downwardly extending angled portion.

18. The method of assembling of claim 16, the method further comprising providing a lower longitudinally extending reinforcing plate portion with an upwardly extending angled section between the upwardly extending angled portion and the longitudinally extending central portion, extending a longitudinally extending central section from the upwardly extending angled section along the longitudinally extending central portion, and extending a downwardly extending angled section from the longitudinally extending central section between the longitudinally extending central portion and the downwardly extending angled portion.

19. The method of assembling of claim 15, the method further comprising providing the upper radius rod member with an axially extending portion, an outwardly extending angled portion and an inwardly extending angled portion, wherein the laterally offset central portion is defined by the outwardly extending angled portion and the inwardly extending angled portion.

20. The method of assembling of claim 19, the method further comprising extending a first upper angled reinforcing plate portion between the axially extending portion and the outwardly extending angled portion and extending a second upper angled reinforcing plate portion between the outwardly extending angled portion and the inwardly extending angled portion.

* * * * *